United States Patent [19]

Wagstaff, III

[11] Patent Number: 4,792,040
[45] Date of Patent: Dec. 20, 1988

[54] COMBINATION MOTORCYCLE COVER AND RAIN GEAR WITH STORAGE POUCH

[76] Inventor: Henry C. Wagstaff, III, 28 McFall Rd., Apalachin, N.Y. 13732

[21] Appl. No.: 103,608

[22] Filed: Oct. 2, 1987

[51] Int. Cl.$^4$ .......................... A41D 3/00; B60J 11/00; B62J 19/00; A45C 15/00
[52] U.S. Cl. .................................... 206/223; 206/278; 206/335; 150/52 R; 150/52 K; 2/1; 2/84; 135/88; 296/136; 296/79.1; 383/38; 224/151; 224/31
[58] Field of Search .................... 150/52 R, 52 K, 106; 206/335, 223, 278; 2/69, 79, 84, 94, DIG. 5, 1; 296/78.1, 78 R, 136; 135/95, 88, 96; 383/4, 38; 224/151, 258, 224, 31, 32 R, 153, 154, 34; 190/1

[56] References Cited

U.S. PATENT DOCUMENTS

| | | |
|---|---|---|
| 2,297,117 | 9/1942 | Weinberg .................................. 2/79 |
| 2,531,501 | 11/1950 | Cline ....................................... 190/1 X |
| 3,389,407 | 6/1968 | Morrison .................................. 2/84 |
| 3,584,315 | 6/1971 | Hardy ...................................... 2/89 |
| 3,801,986 | 4/1974 | Purdon ..................................... 2/69 |
| 3,884,523 | 5/1975 | Allen .................................. 206/335 X |
| 3,979,147 | 9/1976 | Kelley ................................... 296/78.1 |
| 4,045,077 | 8/1977 | De Vone ............................... 296/78.1 |
| 4,114,633 | 9/1978 | Herbez ................................ 135/95 X |
| 4,171,145 | 10/1979 | Pearson Sr. .......................... 296/78.1 |
| 4,263,951 | 4/1981 | Siegel .................................. 150/106 X |
| 4,283,084 | 8/1981 | Gallagher ............................. 296/78.1 |
| 4,326,728 | 4/1982 | Tatch ................................ 296/78.1 X |
| 4,389,735 | 6/1983 | McLaughlin ............................. 2/94 |
| 4,418,854 | 12/1983 | Genovese .............................. 224/154 |
| 4,440,436 | 4/1984 | Giddens et al. ................. 296/78.1 X |
| 4,547,904 | 10/1985 | Long et al. ..................... 2/DIG. 5 X |
| 4,563,777 | 1/1986 | Park ......................................... 2/94 X |

FOREIGN PATENT DOCUMENTS

| | | | |
|---|---|---|---|
| 31860 | 7/1981 | European Pat. Off. ............. 224/154 |
| 3517967 | 11/1985 | Fed. Rep. of Germany ........ 135/88 |
| 2553981 | 5/1985 | France ................................ 224/153 |
| 4531207 | 12/1970 | Japan .................................. 296/136 |
| 444722 | 3/1936 | United Kingdom .................. 135/96 |
| 1561459 | 2/1980 | United Kingdom ..................... 2/94 |
| 1581786 | 12/1980 | United Kingdom .................. 135/96 |

Primary Examiner—Sue A. Weaver
Attorney, Agent, or Firm—Jerry T. Kearns

[57] ABSTRACT

A cover for a motorcycle and a rain suit for a motorcycle rider are contained on opposite sides of a single pouch. The motorcycle cover is contained within one compartment of the pouch and is accessed by opening a Velcro fastened flap. The rain suit is contained on the opposite side of the pouch and is also received beneath a Velcro fastened flap. When the motorcycle rider is wearing the rain suit, the pouch containing the motorcycle cover is disposed on the rider's back. The rain suit includes a hood, removably received within a pocket on the upper back portion of the rain suit. Closures are provided at the wrists and ankles of the rain suit. When it is desired to place the cover over the motorcycle, the rain suit is folded and stored within the compartment on one side of the pouch and the motorcycle cover is withdrawn from the other side of the pouch and placed over the motorcycle.

10 Claims, 4 Drawing Sheets

COMBINATION MOTORCYCLE COVER AND RAIN GEAR WITH STORAGE POUCH

BACKGROUND OF THE INVENTION

1. Field of the Invention

The present invention relates to motorcycle covers and rain suits for motorcycle riders, and more particularly pertains to a new and improved combination motorcycle cover and rain suit. When a garage is not available to a motorcycle owner, it is necessary to park the motorcycle outside, exposed to the elements. Because the seat, engine, controls and other components of the motorcycle are not enclosed, as is the case with an automobile, the various components of the motorcycle are more subject to degradation by exposure to precipitation and ultra violet light. In order to alleviate these problems, various types of motorocycle covers have been utilized and are available on the market place. These motorcycle covers are generally bulky and cumbersome to transport. Thus, when a motorcycle rider desires to park his motorcycle at a location remote from this home, it is necessary to transport the bulky motorcycle cover to that location. When a motorcycle rider encounters inclement weather such as rain, he is devoid of the protection afforded occupants of automobiles. In order to afford protection from the elements to motorcycle riders, various types of rain gear and rain suits have been developed. These suits are generally slicker-type garments, which do provide adequate protection from the elements. However, these garments must necessarily be transported on the motorcycle, if they are to be available to the motorcycle rider when rainstorms are encountered. The necessity of transporting both the motorcycle cover and the rain gear creates a storage problem. In order to overcome the aforesaid problems, the present invention provides a motorcycle cover and rain suit stored on opposite sides of a single pouch.

2. Desciption of the Prior Art

Various types of motorcycle covers are known in the prior art. A typical example of such a motorcycle cover is to be found in U.S. Pat. No. 3,979,147, which issued to R. Kelley on Sept. 7, 1976. This patent discloses a fully manually detachable rigid transparent cover and two detachable connecting elements which provide all weather protection to motorcycle riders and provide protection for a motorcycle. U.S. Pat. No. 4,045,077, which issued to J. DeVone on Aug. 30, 1977, discloses a top for cycles which provides protection against the elements. One feature of this device is a transparent weather shield which has an adjustable top which may be detached and converted into a table. U.S. Pat. No. 4,171,145, which issued to R. Pearson on Oct. 16, 1979, discloses a retractable seat cover for a motorcycle which may be unrolled from a spring loaded spool mounted in a housing attached behind the motorcycle seat to cover the seat and the tank of the motorcycle. The protective covering includes a long, substantially rectangular top panel formed of heavy waterproof material and two long, narrow upper side panels provided with narrow lower side panels. U.S. Pat. No. 4,283,084, which issued to D. Gallagher on Aug. 11, 1981, discloses a lightweight covering for a motorcycle seat to the front of the tank and covers both sides of the engine. Side loops are provided for securing the cover to corresponding motorcycle foot posts and opposing front corners are adapted to overlap in front of the engine and releasably attach to each other. U.S. Pat. No. 4,326,728, which issued to F. Tatch on Apr. 27, 1982, discloses a fairing for attachment to a modified form of bicycle. U.S. Pat. No. 4,440,436, which issued to M. Giddens et al on Apr. 3, 1984, discloses a convertible canopy for motorcycles, snowmobiles and other vehicles which is adjustable to fit a variety of different vehicle configurations. The canopy utilizes a fabric cover supported on pivotal struts.

While the above mentioned devices are suited for their intended usage, none of these devices provides a combination motorcycle cover and rain suit. Additionally, none of the aforesaid patents disclose a compact easily portable package containing both a rain suit and a motorcycle cover. Inasmuch as the art is relatively crowded with respect to these various types of motorcycle covers, it can be appreciated that there is a continuing need for and interest in improvements to such motorcycle covers, and in this respect, the present invention addresses this need and interest.

SUMMARY OF THE INVENTION

In view of the foregoing disadvantages inherent in the known types of motorcycle covers now present in the prior art, the present invention provides an improved combination motorcycle cover and rain gear. As such, the general purpose of the present invention, which will be described subsequently in greater detail, is to provide a new and improved combination motorcycle cover and rain gear which has all the advantages of the prior art motorcycle covers and none of the disadvantages.

To attain this, representative embodiments of the concepts of the present invention are illustrated in the drawings and make use of a pouch containing a motorcycle cover on one side and a rain suit for a motorcycle rider on the opposite side. Both the motorcycle cover and the rain suit are removably retained within compartments by Velcro closure flaps. When the rain suit is being worn by a rider, the pouch containing the motorcycle cover is positioned on the upper back portion of the rider. The rain suit includes a hood which may be withdrawn from a compartment adjacent the neck portion of the rain suit.

There has thus been outlined, rather broadly, the more important features of the invention in order that the detailed description thereof that follows may be better understood, and in order that the present contribution to the art may be better appreciated. There are, or course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention is any way.

It is therefore an object of the present invention to provide a new and improved combination motorcycle cover and rain gear which has all the advantages of the prior art motorcycle covers and none of the disadvantages.

It is another object of the present invention to provide a new and improved combination motorcycle cover and rain gear which may be easily and efficiently manufactured and marketed.

It is a further object of the present invention to provide a new and improved combination motorcycle cover and rain gear which is of a durable and reliable construction.

An even further object of the present invention is to provide a new and improved combination motorcycle cover and rain gear which is susceptible of a low cost of manufacture with regard to both materials and labor, and which accordingly is then susceptible of low prices of sale to the consuming public, thereby making such combination motorcycle covers and rain suits economically available to the buying public.

Still yet another object of the present invention is to provide a new and improved combination motorcycle cover and rain gear which provides in the apparatuses and methods of the prior art some of the advantages thereof, while simultaneously overcoming some of the disadvantages normally associated therewith.

Still another object of the present invention is to provide a new and improved combination motorcycle cover and rain gear which may be easily transporterd and stored.

Yet another object of the present invention is to provide a new and improved combination motorcycle cover and rain gear which provides a pouch having storage compartments on opposite sides for both a motorcycle cover and a rain suit.

Even still another object of the present invention is to provide a new and improved combination motorcycle cover and rain gear which allows a motorcycle cover to be unobtrusively stored on the back of a motorcycle rider when the rain suit is in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
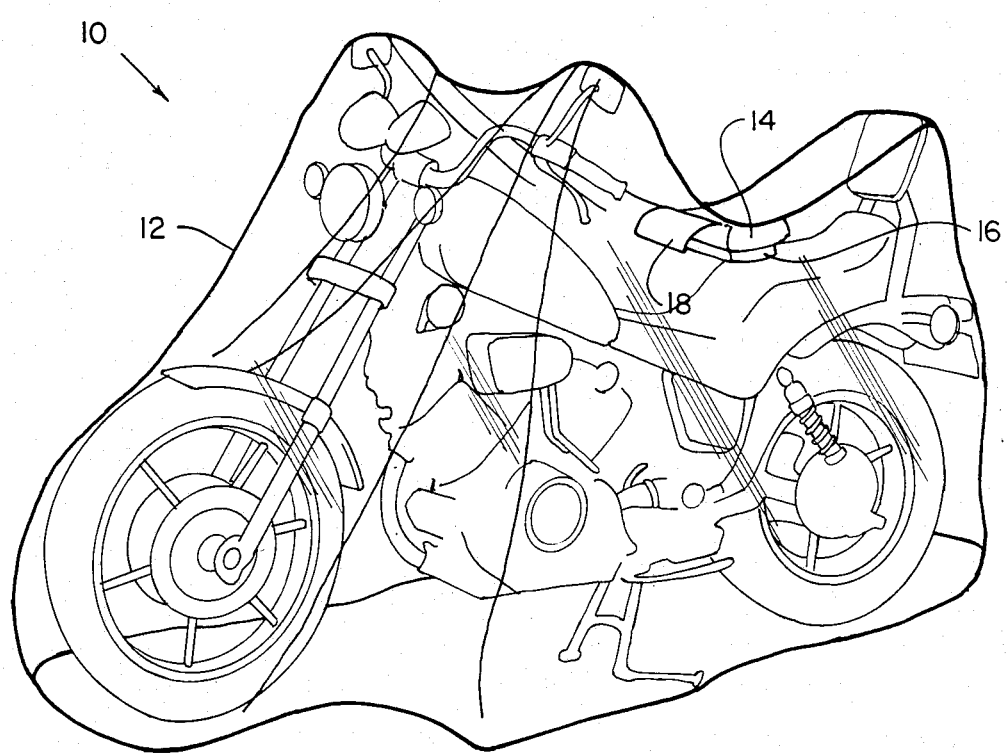
FIG. 1 is a perspective view of a motorcycle being covered by the combination motorcycle cover and rain gear of the present invention.

With reference now to the drawings, and in particular to FIG. 1 thereof, a new and improved combination motorcycle cover and rain gear embodying the principles and concepts of the present invention and generally designated by the reference numeral 10 will be described.

More specifically, it will be noted that the first embodiment 10 of the invention includes a motorcycle cover 12, which may be formed from a fabric or a plastic material, in a conventional fashion. The motorcycle cover 12 may be provided with conventional grommets, straps or other fasteneing devices for securing the cover on a motorcycle. The motorcycle cover 12 is attached to a storage pouch 14. When not in use, the motorcycle cover 12 is stored wtihin a storage compartment which is then closed by a Velcro fastener flap 18. The storage pouch 14 has a storage compartment 16, containing a rain suit. The rain suit storage compartment 16 is located on a side of the pouch 14 opposite the motorcycle cover storage compartment.

Figure 2:
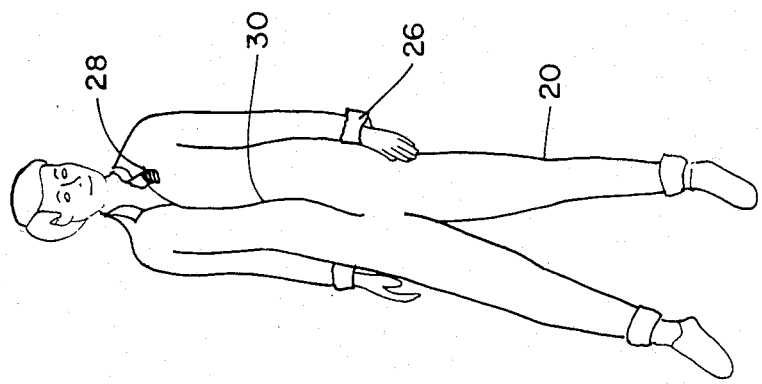
FIG. 2 is a perspective view of a motorcycle rider wearing the rain suit of the present invention.

With reference now to FIG. 2, it may be seen that the rain suit 20 of the present invention may be worn in a conventional manner by a motorcycle rider. The rain suit 20 includes a Velcro closure 26 at the wrists of the rider and a Velcor closure 28 at the neck of a rider. In order to enable the rider to put the suit on, a longitudinal opening is provided, which may be closed by conventional means such as a zipper 30.

Figure 3:
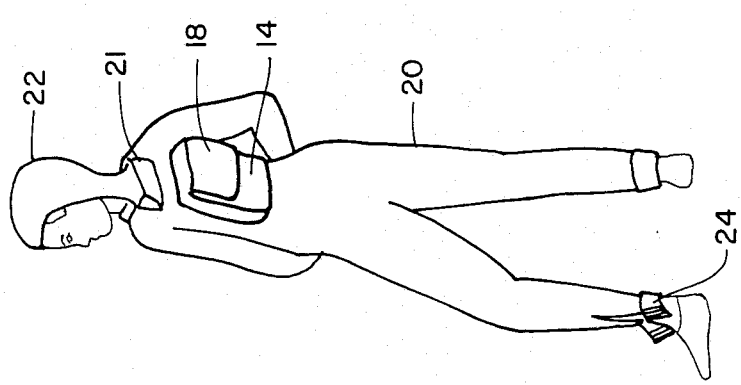
FIG. 3 is a perspective view of the back of a motorcycle rider, while wearing the rain suit.

FIG. 3 is a view of the motorcycle rider's back, while wearing the rain suit 20 of the present invention. It may be seen that the rain suit 20 includes Velcro closures 24 at the ankles of the rider. While the rain suit 20 is in use, the storage pouch 14 is located on the back of the rider. The motorcycle cover 12 is contained within the storage pouch 14, and retained therein by a Velcro fastened flap 18. A pocket 21 provided adjacent the neck portion of the rain suit 20, is utilized to removably retain a hood 22. The pocket 21 may be provided with a Velcro closure.

Figure 4:
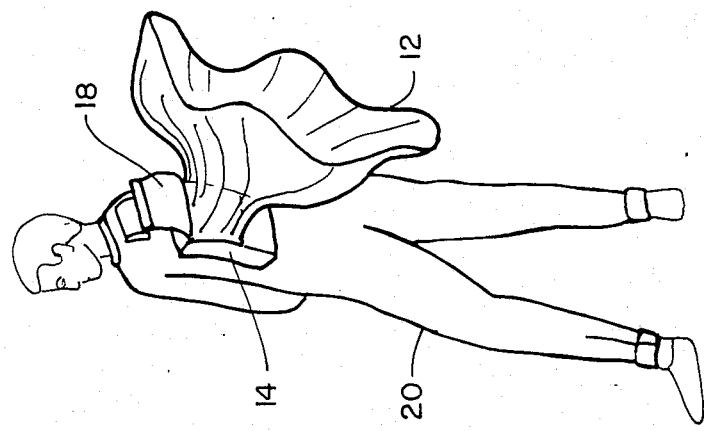
FIG. 4 is a perspective view of the back of the motorcycle rider wearing the rain suit, with the motorcycle cover partially withdrawn from the storage pouch.

In FIG. 4, the motorcycle cover 12 is shown partially withdrawn from the storage pouch 14. The flap 18 has been opened to gain access to the cover 12.

Figure 5:
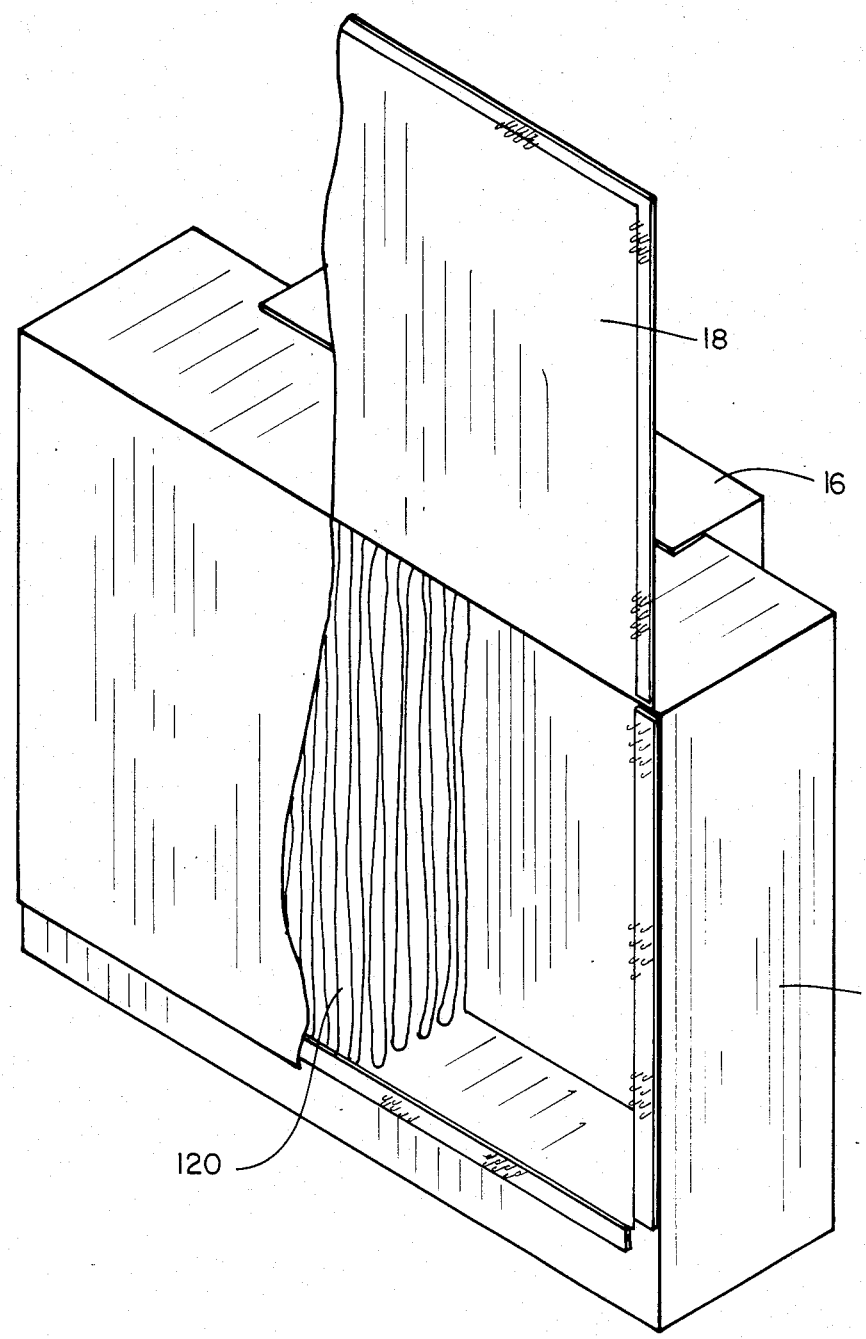
FIG. 5 is a perspective view of the storage pouch of the present invention, illustrating the motorcycle cover storage compartment.

In FIG. 5, the storage pouch 14 is illustrated with the flap 18 partially cut away and opened. It may be seen that the motorcycle cover 12 is stored in a pleated folded condition within a compartment in the pouch 14.

The rain suit storage compartment 16 is located on the opposite side of the storage pouch 14.

Figure 6:
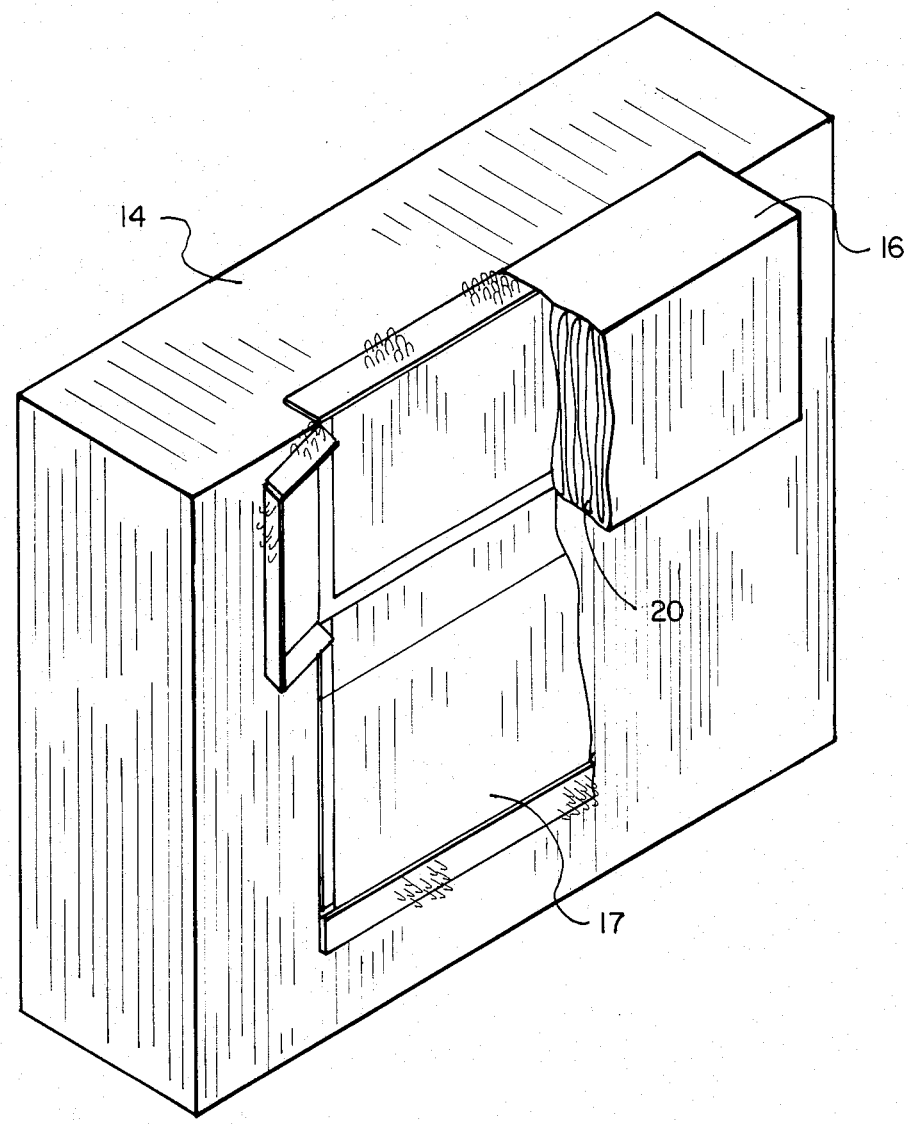
FIG. 6 is a perspective view of the storage pouch of the present invention, illustrating the rain suit storage compartment.

In FIG. 6, the storage pouch 14 is illustrated with the Velcro fastened retaining flap 17 partially cut away and opened. This is for purposes of illustrating the pleated folded condition of the rain suit 20 within the storage compartment. It should be noted that both the rain suit 20 and the motorcycle cover 12 are attached to the storage pouch 14.

The manner of usage of the motorcycle cover and rain suit of the present invention will now be described. When not in use, the storage pouch 14 may be conveniently stored behind or on a back portion of the motorcycle seat or in other convenient locations. When it is desired to utilize the rain suit 20, the retaining flap 17 is opened (FIG. 6) and the suit is unfolded from within the storage compartment 16. The motorcycle rider then steps into the suit in a conventional fashion and fastnes the ankle, wrist and neck closures. In this condition, the storage pouch 14 will be unobtrusively located on the back of the rider in the manner of a backpack. It should be noted that the rain suit 20 and motorcycle cover 12 may be constructed from a lightweight plastic material, or may be constructed from nylon or other fabric materials. It should also be obvious to those of ordinary skill in the art that various conventional waterproofing treatments may be applied to both the motorcycle cover 12 and rain suit 20 without departing from the scope of the present invention. When the need for the rain suit 20 is over, it is then folded and placed back into storage within the compartment 16. When a motorcycle rider parks the motorcycle, the retaining flap 18 is opened and the motorcycle cover 12 is withdrawn from the storage pouch 14, and placed over the motorcycle in a conventional fashion. Thus, it may be seen that the combination motorcycle cover and rainsuit of the present invention provides a compact and convenient storage pouch for the transport of these necessary motorcycle accessories.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. pg,18

What is claimed as being new and desired to be protected by Letters Patent of the United States is as follows:

1. A new and improved combination motorcycle cover and rain gear, comprising:
   storage pouch means;
   a first storage compartment means on a first side of said storage pouch means;
   a second storage compartment means on a second side of said storage pouch means;
   motorcycle cover means formed from a flexible material folded within said first storage compartment means, and attached thereto; and
   a rain suit formed from a flexible material folded within said second storage compartment means, and attached thereto.

2. The combination motorcycle cover and rain gear of claim 1, wherein each of said first and second storage compartment means are provided with a selectively openable and closable retaining flap means.

3. The combination motorcycle cover and rain gear of claim 2, wherein each of said flap means comprise Velcro fastened flaps.

4. The combination motorcycle cover and rain gear of claim 1, wherein said rain suit further comprises a pocket formed adjacent a neck portion thereof, and a hood means removably retained in said pocket.

5. The combination motorcycle cover and rain gear of claim 1, wherein said rain suit further comprises ankle, wrist, and neck closure means.

6. The combination motorcycle cover and rain gear of claim 5, wherein said closure means comprise Velcro fasteners.

7. The combination motorcycle cover and rain gear of claim 1, wherein when said rain suit is removed from said second storage compartment means, and worn by a motorcycle rider, said storage pouch means is disposed on a back portion of said rain suit.

8. A new and improved combination motorcycle cover and rain gear, comprising:
   a storage pouch;
   a first compartment formed on one side of said storage pouch;
   a second compartment formed on an opposite side of said storage pouch;
   a motorcycle cover formed from a flexible material, removably retained in said first compartment, and attached to said storage pouch;
   a rain suit formed from a flexible material, removably retained in said second compartment, and attached to said storage pouch; and
   a pair of Velcro fastened retaining flaps on said storage pouch for selectively opening and closing said first and second compartments.

9. The combination motorcycle cover and rain gear of claim 8, further comprising a pocket formed on said rain suit, adjacent a back neck portion thereof, and a hood removably received in said pocket.

10. The combination motorcycle cover and rain gear of claim 8, wherein when said rain suit is removed from said second compartment and worn by a motorcycle rider, said storage pouch is disposed on a back portion of said rain suit, and attached thereto.

* * * * *